United States Patent
Kondo et al.

(10) Patent No.: US 8,365,233 B2
(45) Date of Patent: Jan. 29, 2013

(54) PROGRAM DISTRIBUTION SYSTEM AND RECORDING AND REPRODUCTION DEVICE

(75) Inventors: Kazumoto Kondo, Tokyo (JP);
Yasuhisa Nakajima, Kanagawa (JP);
Kei Matsubayashi, Kanagawa (JP)

(73) Assignee: Sony Corporation (JP)

( * ) Notice: Subject to any disclaimer, the term of this patent is extended or adjusted under 35 U.S.C. 154(b) by 489 days.

(21) Appl. No.: 12/008,453

(22) Filed: Jan. 11, 2008

(65) Prior Publication Data

US 2008/0172692 A1 Jul. 17, 2008

(30) Foreign Application Priority Data

Jan. 16, 2007 (JP) ................ P2007-007269

(51) Int. Cl.
*H04N 7/173* (2006.01)
*G06F 3/00* (2006.01)
*G06F 13/00* (2006.01)
*H04N 5/445* (2006.01)

(52) U.S. Cl. ............ 725/86; 725/39; 725/114; 725/133

(58) Field of Classification Search .................. 725/114, 725/133, 37–61, 86
See application file for complete search history.

(56) References Cited

U.S. PATENT DOCUMENTS

| | | | | |
|---|---|---|---|---|
| 6,496,980 | B1 * | 12/2002 | Tillman et al. .................. | 725/90 |
| 6,601,074 | B1 * | 7/2003 | Liebenow ............... | 348/E7.061 |
| 7,647,332 | B2 * | 1/2010 | Van Flandern et al. ....................... | 707/999.101 |
| 2002/0116473 | A1 * | 8/2002 | Gemmell ..................... | 709/219 |
| 2003/0237097 | A1 * | 12/2003 | Marshall et al. .............. | 725/105 |
| 2005/0034152 | A1 * | 2/2005 | Matsumoto et al. ............ | 725/32 |
| 2005/0246757 | A1 * | 11/2005 | Relan et al. .................... | 725/135 |
| 2007/0101370 | A1 * | 5/2007 | Calderwood ................... | 725/47 |
| 2007/0101387 | A1 * | 5/2007 | Hua et al. ...................... | 725/113 |
| 2007/0277202 | A1 * | 11/2007 | Lin et al. ......................... | 725/46 |
| 2008/0141303 | A1 * | 6/2008 | Walker et al. ................... | 725/39 |
| 2009/0031038 | A1 * | 1/2009 | Shukla et al. ................. | 709/231 |

FOREIGN PATENT DOCUMENTS

| | | |
|---|---|---|
| JP | 2001-275072 A | 10/2001 |
| JP | 2002232815 A | 8/2002 |
| JP | 2003-046958 A | 2/2003 |
| JP | 2004-104416 A | 4/2004 |
| JP | 2004260638 A | 9/2004 |
| JP | 2005312023 A | 11/2005 |
| JP | 2006211615 A | 8/2006 |
| JP | 2006217018 A | 8/2006 |
| WO | 2005-112452 A1 | 11/2005 |

OTHER PUBLICATIONS

Office Action from Japanese Application No. 2007-007269, dated Feb. 28, 2012.

* cited by examiner

*Primary Examiner* — Scott Beliveau
*Assistant Examiner* — Alexander Q Huerta
(74) *Attorney, Agent, or Firm* — Lerner, David, Littenberg, Krumholz & Mentlik, LLP

(57) ABSTRACT

A program distribution system is disclosed. The system includes: a broadcast station; a recording and reproduction device that is capable of recording and reproducing data of program contents coming from the broadcast station by cable or by radio; and a content server that is capable of distributing, over a network, the data of the program contents to the recording and reproduction device through connection thereto over the network. In the system, the recording and reproduction device includes a storage section, a recording and reproduction control section, and a higher-quality data acquisition control section.

6 Claims, 10 Drawing Sheets

FIG. 7

| COMPONENT DETAILS | COMPONENT TYPE | DESCRIPTION |
|---|---|---|
| 0x00 | 0x00-0xFF | RESERVATION FOR FUTURE USE |
| 0x01 | 0x00 | RESERVATION FOR FUTURE USE |
| 0x01 | 0x01 | VIDEO 480i (525i), ASPECT RATIO 4:3 |
| 0x01 | 0x02 | VIDEO 480i (525i), ASPECT RATIO 16:9 WITH PAN VECTOR |
| 0x01 | 0x03 | VIDEO 480i (525i), ASPECT RATIO 16:9 WITHOUT PAN VECTOR |
| 0x01 | 0x04 | VIDEO 480i (525i), ASPECT RATIO > 16:9 |
| 0x01 | 0x05-0xA0 | RESERVATION FOR FUTURE USE |
| 0x01 | 0xA1 | VIDEO 480p (525p), ASPECT RATIO 4:3 |
| 0x01 | 0xA2 | VIDEO 480p (525p), ASPECT RATIO 16:9 WITH PAN VECTOR |
| 0x01 | 0xA3 | VIDEO 480p (525p), ASPECT RATIO 16:9 WITHOUT PAN VECTOR |
| 0x01 | 0xA4 | VIDEO 480p (525p), ASPECT RATIO > 16:9 |
| 0x01 | 0xA5-0xB0 | RESERVATION FOR FUTURE USE |
| 0x01 | 0xB1 | VIDEO 1080i (1125i), ASPECT RATIO 4:3 |
| 0x01 | 0xB2 | VIDEO 1080i (1125i), ASPECT RATIO 16:9 WITH PAN VECTOR |
| 0x01 | 0xB3 | VIDEO 1080i (1125i), ASPECT RATIO 16:9 WITHOUT PAN VECTOR |
| 0x01 | 0xB4 | VIDEO 1080i (1125i), ASPECT RATIO > 16:9 |
| 0x01 | 0xB5-0xC0 | RESERVATION FOR FUTURE USE |
| 0x01 | 0xC1 | VIDEO 720p (750p), ASPECT RATIO 4:3 |
| 0x01 | 0xC2 | VIDEO 720p (750p), ASPECT RATIO 16:9 WITH PAN VECTOR |
| 0x01 | 0xC3 | VIDEO 720p (750p), ASPECT RATIO 16:9 WITHOUT PAN VECTOR |
| 0x01 | 0xC4 | VIDEO 720p (750p), ASPECT RATIO > 16:9 |

FIG. 8

■ RECORDING LIST (HDD: ORIGINAL)　　　　　THUR. JAN 1, 0:03AM

TIME LEFT AVAILABLE IN HDD: [SD] 31 HOURS AND 57 MINUTES

[BS] 151　[BSA]　[⊙] WORLD REPORT

BS XX

WED. JAN 28, 9:00PM　31 MINUTES [HD]

| | TITLE NAME | DATE OF RECORDING | TIME | MODE |
|---|---|---|---|---|
| 1 | HEATLAND | THUR. JAN 1 | 1 MINUTE | FINE |
| 2 | THE FLOWER ESSAYS "AAA" | WED. JAN 28 | 6 MINUTES | HD |
| 3 | DRAGON'S DEN | WED. JAN 28 | 31 MINUTES | HD |
| 4 | "BBB" NEWS WEDNESDAY NIGHT | WED. JAN 28 | 52 MINUTES | HD |
| 5 | THE FLOWER ESSAYS "CCC" | WED. JAN 28 | 5 MINUTES | HD |
| 6 | "DDD" WORLD REPORT | WED. JAN 28 | 31 MINUTES | HFR |

▼ NEXT　[ORDER OF RECORDING]　　　6/TOTAL 14 TITLES

SELECT BY ♦ AND PUSH [ENTER]　RETURN TO PREVIOUS SCREEN BY [RETURN]　END BY [END]

[BLUE] SCREEN LIST　　[RED] SORTING　　[YELLOW] FUNCTION MENU

HRF: HIGH FRAME RATE
2K4K: HIGH RESOLUTION
FHD: HIGH RESOLUTION (FULL HD)
xvYCC: EXTENDED RANGE COLOR SPACE
...

PROGRAM DISTRIBUTION SYSTEM AND RECORDING AND REPRODUCTION DEVICE

CROSS-REFERENCE TO RELATED APPLICATIONS

The present application claims priority from Japanese Patent Application No. JP 2007-007269 filed in the Japanese Patent Office on Jan. 16, 2007, the entire content of which is incorporated herein by reference.

BACKGROUND OF THE INVENTION

1. Field of the Invention

The present invention relates to a program distribution system and a recording and reproduction device that can record, for reproduction in real time, video data of program contents coming from a broadcast station by cable or by radio, and also can acquire data of program contents over a network.

2. Description of the Related Art

Broadcast programs have been distributed by radio waves from broadcast stations and by cable television systems, and recently the program distribution over a network starts taking over such previous program distribution. This is due to the environment established for distributing data of program contents from a content server in a broadcast station or others through downloading or streaming over a network such as the Internet. The program distribution is also being improved in quality with the commencement of the digital broadcasting (terrestrial broadcasting) service, and with various types of improvements in the network environment, i.e., improvements of transmission speed, processing speed of reception devices, and display capability (resolution and response speed) of display devices.

There is a known technology for swiftly receiving, over a network, higher-quality version of data, i.e., stream data of high definition with a high frame rate. As an example, refer to Patent Document 1 (JP-A-2004-104416).

For broadcasting by radio waves and by cable television systems, there is also a known technology for acquiring higher-quality video data utilizing a repeat of a program. As an example, refer to Patent Document 2 (JP-A-2001-275072).

SUMMARY OF THE INVENTION

The previous broadcasting service by radio waves and by cable television systems is basically the same in digital broadcasting service. However, the previous broadcasting service and the recent over-a-network broadcasting service utilizing the mechanism of the Internet protocol (IP) are not merged well together but there is no mechanism for linking program contents therebetween.

The important perspective for previous broadcasting service is real-time distribution on the broadcast time and date notified by program information. On the other hand, with the over-a-network broadcasting service, the perspective is rather of time-shifting while sacrificing the real-time characteristics to some degree. With such perspective of time-shifting, a user can see programs whenever he or she wants to. That is, the over-a-network broadcasting service is being utilized as a complement to the previous broadcasting service, i.e., providing, if a user wants, recorded data of program contents that were already put on the air by previous broadcasting service.

Although the previous broadcasting service is sending out video of high definition (HD) standards, the recently-proposed video standards are of ultra high definition, and the display capability of display devices is being improved to catch up with video of such ultra high definition.

The problem here is that, with the previous broadcasting service, even if provided are high-image-quality contents with a resolution much higher than that of the HD standards and with a higher frame rate, the amount data is too much therefor, and thus the data of such high-image-quality contents cannot be sent out in real time. It means that there is no way of viewing such high-image-quality video with previous broadcasting services, e.g., broadcasting by radio waves and by cable television systems, but only with the over-a-network broadcasting service.

On the other hand, with the over-a-network broadcasting service, for real-time viewing of the huge amount of content data of the HD standards or higher, the network band is not enough, and there is thus no choice but to adopt the supply form of VOD (Video On Demand), for example. That is, the environment is not yet ready for real-time viewing of images of ultra high image quality over the network. Moreover, the program supply form of VOD (Video On Demand) or others require to go through the procedure of downloading through a search of programs that were already put on the air with the previous broadcasting service, thereby not providing sufficient level of user convenience. In this case, the user cannot swiftly start streaming reproduction on demand, whereby there is no choice but to wait program viewing until downloading is completed.

In Patent Document 1 above, described is the method of acquiring high-definition high-frame-rate stream data at high speed with the Internet broadcasting. The problem here is that this technology is only aiming to achieve comfortable operation with time reduction of several to several tens of seconds but is not aiming to acquire contents being many times larger in data amount than those available with previous broadcasting service.

In Patent Document 2 above, proposed is the method of acquiring high-image-quality contents utilizing a repeat of a program. However, the method is restrictively applicable to broadcasting utilizing radio waves and others, and is not about content acquisition over the network.

As such, there is no technology for implementing a program distribution system that allows real-time program viewing of program contents, and eases storage of higher-quality version of video data of the program contents, and a recording and reproduction device for such a system.

According to a first embodiment of the present invention, there is provided a program distribution system that includes: a broadcast station; a recording and reproduction device that is capable of recording and reproducing data of program contents coming from the broadcast station by cable or by radio; and a content server that is capable of distributing, over a network, the data of the program contents to the recording and reproduction device through connection thereto over the network. The recording and reproduction device includes: a storage section that stores therein the data of the program contents; a recording and reproduction control section; and a higher-quality data acquisition control section.

The recording and reproduction control section can perform control of recording, into the storage section, video data of the program contents provided from the broadcast station, and reproducing the video data in real time.

The high-quality data acquisition control section makes an inquiry to the content server, over the network, after recording with real-time-reproduction is started as a result of control by the recording and reproduction control section, about a possibility of acquisition of higher quality version of data of the program contents than the data recorded, and when an inquiry result is positive, acquires the higher-quality version of the data from the content server over the network.

In the first embodiment of the invention, preferably, the higher-quality version of the data is any one of video data with a resolution higher compared with video data of the program contents provided by the broadcast station, video data with a frame rate higher compared therewith, and video data of extended range color space standards with color reproducibility higher compared therewith.

More preferably, when the higher-quality version of the data is the video data with the higher resolution or the video data of the extended range color space standards, the higher-quality data acquisition control section controls the storage section to store therein the higher-resolution video data or the video data of the extended range color space standards as a replacement of the video data of the program contents being in storage.

Or preferably, the recording and reproduction device further includes an image synthesis section that can perform frame rate conversion through image synthesis. When the higher-quality version of the data is the video data with the higher frame rate, the higher-quality data acquisition control section performs control of synthesizing, by the image synthesis section, through control over the image synthesis section and the storage section, the video data stored in the storage section with the high-frame-rate video data of the program contents provided by the content server, and generating a high-frame-rate image on the storage section.

In the first embodiment of the invention, preferably, the recording and reproduction device further includes a search control section.

The search control section searches, when recording with real-time-reproduction is started, directly or over a local network, another recording device connected thereto by cable or by radio to see whether a higher quality version of the video data than the data recorded with real-time-reproduction is already recorded therein.

When the higher-quality version of the video data is detected as a result of the search made by the search control section, the detected higher-quality version of the video data is copied or moved from the another recording device to the recording and reproduction device, or a result of the search is informed thereto. On the other hand, when the higher-quality version of the video data is not detected, the higher-quality data acquisition control section makes the inquiry to the content server.

According to a second embodiment of the invention, there is provided a recording and reproduction device capable of recording and reproducing data of program contents coming from a broadcast station by cable or by radio, and the device includes: a storage section that stores therein the data of the program contents; a recording and reproduction control section; and a higher-quality data acquisition control section.

The recording and reproduction control section can perform control of recording, into the storage section, video data of the program contents provided by the broadcast station, and reproducing the video data in real time.

The higher-quality data acquisition control section controls to make an inquiry to, over the network, after recording with real-time-reproduction is started as a result of control by the recording and reproduction control section, the content server connected to the network about a possibility of acquisition of higher quality version of data of the program contents than the data recorded, and when an inquiry result is positive, to acquire the higher-quality version of the data from the content server over the network.

According to such embodiments of the invention, real-time program viewing is possible, and program contents being viewed in real time can be easily stored with higher-quality version of data without bothering users.

BRIEF DESCRIPTION OF THE DRAWINGS

FIG. 7 is a chart showing the details of a component descriptor of SI information;

FIG. 8 is a diagram showing an exemplary screen of a recording list;

DESCRIPTION OF THE PREFERRED EMBODIMENTS

Figure 1:
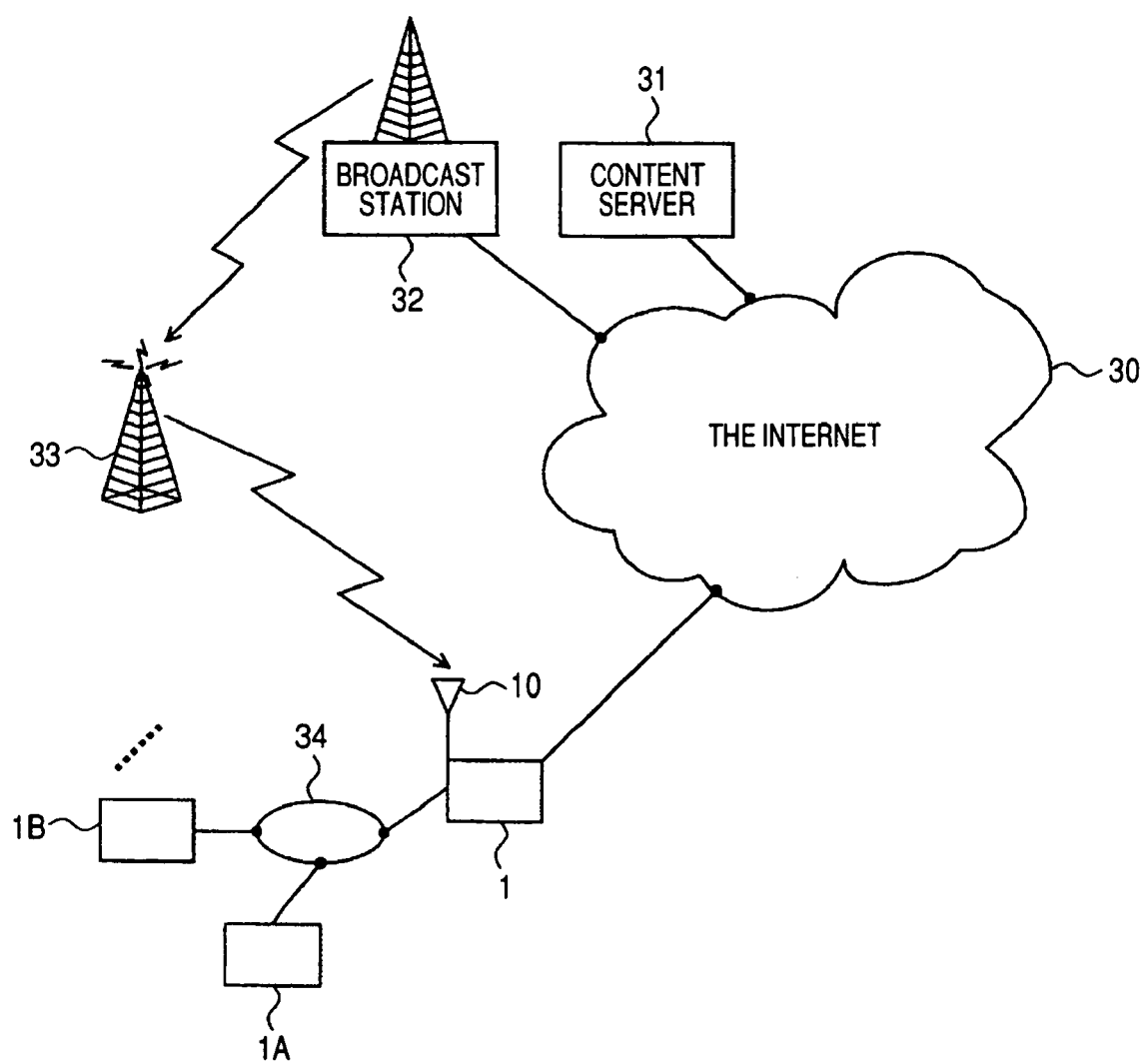
FIG. 1 is a schematic diagram showing the configuration of a program distribution system of a first embodiment.

A program distribution system of an embodiment allows a user to view, in real time reproduction, data of program contents acquired by general broadcast reception by radio waves from a broadcast station and over a cable, and to acquire, over a network such as the Internet, higher quality version of video data of the program contents than the data in real-time-reproduction. In such a program distribution system, a recording and reproduction device of the embodiment serves as a main component.

Herein, the recording and reproduction device receives data of the program contents directly from a broadcast station wirelessly (radio waves) or over a cable (network), and also receives data of the program contents by cable or by radio via broadcast satellites, network program distributors, cable television service providers, and others.

An electronic program guide (EPG) is used to check the sameness between programs. As a determination criterion about the image quality, e.g., resolution and frame rate, possibly used is service information of ARIB-STD (Association of Radio Industries and Businesses—STanDard).

An inquiry is then made about whether a content server on the network is carrying therein higher version of video data than the data that is currently available for real-time reproduction. Herein, the higher-quality version of video data means video data whose resolution, frame rate, or color expression is higher and better than the real-time-reproducible video data provided by a broadcast station. In this embodiment, for example, the expression of "higher-quality version of video data" denotes video data that is in conformity with standards for use to distribute a large amount of contents of high image quality, and video data that is in conformity with the extended range color space standards such as "xvYCC" for moving images. Herein, the standards include HD (High Definition), full HD being higher than HD, and 2k4k, or HFR (High Frame Rate, e.g., 240 fps) that is not applicable to the current broadcasting service. The aspect ratio of such higher-quality version of video data takes any value of 4:3, 16:9, or 2:1 (digital cinema standards), for example.

When any higher-quality version of video data is ready, the recording and reproduction device acquires the higher-quality version of video data through downloading automatically, i.e., without requiring any specific user operation.

At the time of data acquisition as such, before inquiry making, a search may be made to any other recording device connected to the recording and reproduction device directly or over a local network to see whether the device is carrying therein the higher-quality version of video data. When the higher-quality version of video data is found as a result of the search, no inquiry is made, and the data is copied from the recording device where the data is found, or a notification is made to inform the finding.

As such, described above is the brief outline of the program distribution system and that of the recording and reproduction device of the embodiment.

In the below, the embodiment is described more in detail for the recording and reproduction device and the program distribution system including the recording and reproduction device by referring to the accompanying drawings. Exemplified below is a DVD (Digital Versatile Disc) recorder that is capable of receiving broadcast programs and downloading of video data over the Internet.

Note here that the recording and reproduction device to which the invention is applied may be any other types of recording media with a capability of recording and reproduction, e.g., DVD, next-generation disk medium for use with DVD, nonvolatile memory medium, and hard disk. The recording and reproduction device is also exemplified by a television reception and display device capable of recording and reproduction of data to/from such recording media, or small-sized mobile equipment with capabilities of games and telephones. Moreover, real-time reproduction may mean download reproduction of reproducing content data after downloading the data into a storage section equipped with a recording medium, or of reproducing the content data during such downloading. The real-time reproduction may also mean streaming reproduction of reproducing the content data in real time after temporarily storing, into a buffer memory, the content data of the amount reproducible in a seamless manner before storage into the storage section.

First Embodiment

FIG. 1 shows the schematic diagram showing the configuration of a program distribution system of a first embodiment. FIG. 1 shows an exemplary case where a network is the Internet, and broadcasting by radio waves is of digital or analog terrestrial broadcasting. Herein, any cable television provider may exist in the terrestrial broadcasting network. Alternatively to the terrestrial broadcasting or together therewith, digital or analog satellite broadcast reception may be possible.

The Internet 30 of FIG. 1 is connected with a plurality of devices including a recording and reproduction device 1 of the embodiment. FIG. 1 shows only the recording and reproduction device 1, and the remaining other devices are not shown.

The Internet 30 is also connected with a plurality of servers including a content server 31, i.e., from which program contents are provided and managed, and a broadcast station 32.

The content server 31 of FIG. 1 may be one owned by a provider who distributes programs solely using the server. Alternatively, the content server 31 may be one owned by the broadcast station 32, and distribute, over the Internet 30, program content data such as higher-quality version of video data that cannot be transmitted by radio with the current broadcasting standards. The content server 31 puts program information available on the Internet 30, and the program information is called network EPG (Electronic Program Guide). Based on the network EPG, a user makes a request for download distribution or streaming distribution of any program he or she wants to view. When such a request comes from any authorized user who has signed a customer contract, for example, the content server 31 accordingly distributes program data to a recording and reproduction device belonging to the user who has made the request. In the drawing, devices connected to the content server 31 for customer management and others are not shown.

The broadcast station 32 utilizes any previously-available radio broadcasting network for forwarding broadcast waves to a radio tower 33 for relay use, and from the radio tower 33, the digital or analog broadcast waves are transmitted to the recording and reproduction device 1, a television receiver, or others equipped in each household.

The broadcast station 32 sometimes performs program distribution over the Internet, and if this is the case, programs are distributed over the Internet 30 directly to the recording and reproduction device 1 being under a contract, i.e., broadcast reception device, or via a cable television provider being under a contract.

The broadcast station 32 puts program information available on the Internet 30. The program information is called EPG. With digital broadcasting service, the EPG is attached to a header portion of program content data, which is provided by radio waves or others. In this embodiment, alternatively, the header portion may be attached with service information such as ARIB-STD, or alternatively with information indicating the image quality of video, e.g., resolution and frame rate. To apply the invention to a case where such information is not attached to the header portion, e.g., a case of analog broadcasting service, information about the image quality of video is required to be available for every program over the Internet 30.

The recording and reproduction device 1 is connected, over a cable or by radio, to other (household and office use) devices 1A, 1B, and others by a local network 34 such as household-use LAN (Local Area Network) or directly.

In the below, among these devices, the device under the reference numeral 1A is assumed as being a recording device. The local network 34 is often branched and connected to the devices 1A, 1B, and others from the recording and reproduction device 1 via a hub.

Figure 2:
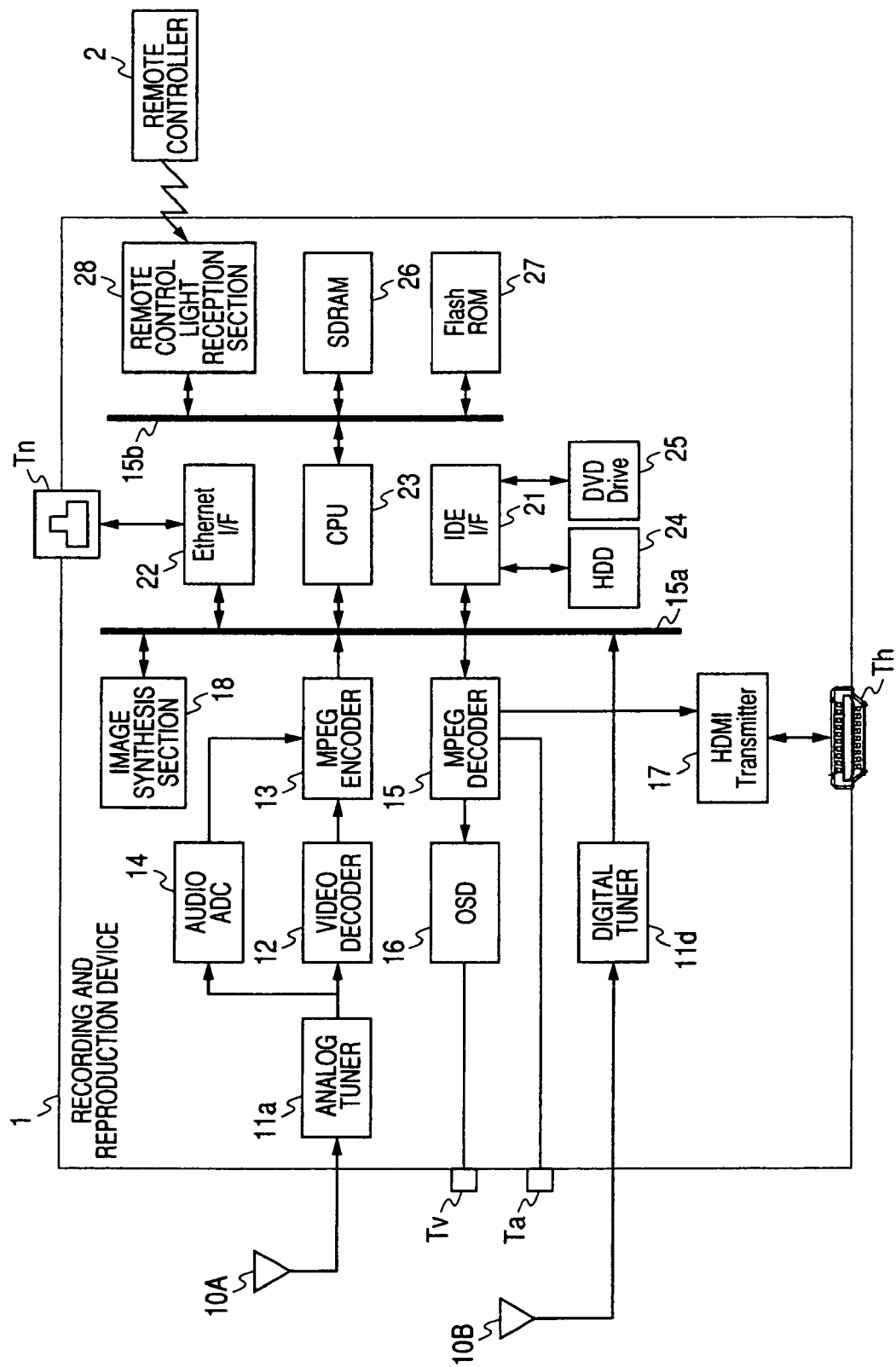
FIG. 2 is a block diagram showing a recording and reproduction device of the first and second embodiments.

FIG. 2 shows the block diagram of the recording and reproduction device (DVD recorder in this example) 1. FIG. 2 is showing an example of the recording and reproduction device that can receive both analog terrestrial broadcasting and digital terrestrial broadcasting.

The recording and reproduction device 1 is connected to an analog reception antenna 10A and a digital reception antenna 10B. An antenna 10 of FIG. 1 includes both of these reception antennas 10A and 10B, and the digital reception antenna 10B serves to receive both terrestrial and satellite broadcasting. In the recording and reproduction device 1, two buses, i.e., an internal bus 15a and a CPU (Central Processing Unit) bus 15b, are provided. These two buses 15a and 15b may be configured by a single bus.

Between an internal terminal of the analog reception antenna 10A and the internal bus 15a, components are connected, i.e., an analog tuner 11a, a video decoder 12, and MPEG (motion Picture Experts Group) encoder 13. Between an output of the analog tuner 11a and the MPEG encoder 13, an audio/Analog to Digital Converter (hereinafter, referred to as audio ADC) 14 is connected.

The analog tuner 11a is a circuit that receives radio waves from the analog reception antenna 10A, and takes charges of frequency conversion (tuning included), noise elimination, amplification, and demodulation. By demodulation, a video signal and an audio signal are separated. The video and audio signals being the demodulation results are forwarded from the analog tuner 11a to the video decoder 12 and the audio ADC 14, respectively.

The video decoder 12 is a circuit that converts, i.e., decodes, the analog video signal being the demodulation result into digital video data. The digital video data is forwarded to the MPEG encoder 13.

The audio ADC 14 converts the analog audio signal being the demodulation result into digital audio data. The digital audio data is forwarded from the audio ADC 14 to the MPEG encoder 13.

The MPEG encoder 13 is a circuit that receives digital video data and audio data, and encodes the video data into a signal of MPEG2 (Motion Picture Experts Group-2) so that the data is compressed. This data compression is performed to reduce the amount of data before recording into a recording medium such as hard disk and DVD. The details are left for later description. In the below, a digital code string after data compression as such is referred to as "MPEG2 bit stream".

The internal bus 15a is connected with an IDE interface (I/F) 21 of IDE (Integrated Drive Electronics) standards, an Ethernet interface (I/F) 22 of Ethernet (trademark) standards, and a CPU 23.

The IDE interface 21 is connected with a hard disk drive (HDD) 24 and a DVD drive 25, both of which are internal recording device.

The hard disk drive 24 carries therein a hard disk being a recording medium. The hard disk is under the control of the CPU 23, and can be stored thereon with content data (MPEG2 bit stream) such as programs based on programming and manual operation.

In the DVD drive 25, a DVD being a recording medium is set to be detachable, and to/from the DVD, a user can copy or move any content data (MPEG2 bit stream), e.g., programs, in the hard disk whatever he or she wants to save. Such a command is issued by the CPU 23 in accordance with any external operation.

The Ethernet interface 22 is connected with a network terminal Tn for establishing a connection to the Internet 30 of FIG. 1.

The Ethernet interface 22 has a function of converting information into a code string, i.e., packet, in conformity with the Ethernet standards. The information here is being exchangeable on every network, and includes an access command, an inquiry, and a response from the CPU 23, and data. The Ethernet interface 22 has also a function of inversely converting a packet from the network into information that can be handled by the CPU 23.

The CPU 23 is a device of controlling the recording and reproduction device 1 in its entirety, e.g., broadcast reception, tuning, storage, copying, moving, and external output of broadcast content data or line-input content data, signal processing of video and audio, and network connection. The CPU 23 performs such control in accordance with any predetermined program.

The CPU 23 is connected with a content memory 26 such as SDRAM (Synchronous Dynamic Random Access Memory), and a control memory 27 such as flash ROM (Flash Read Only Memory) over the CPU bus 15b.

The content memory 26 serves as a rewritable image memory that temporarily stores therein video data of a fixed amount through video signal processing, or stores therein video data of OSD (On Screen Display), which will be described later.

The control memory 27 is a read-only memory specifically provided for storing a control program to be run by the CPU 23, or for storing various types of control parameters.

The recording and reproduction device 1 of FIG. 2 is provided with a video output terminal Tv, an audio output terminal Ta, and a signal terminal Th in conformity with the HDMI (High Definition Multimedia Interface) standards, i.e., HDMI terminal.

Between the internal bus 15a and the video output terminal Tv, an MPEG decoder 15 and an OSD (On Screen Display) processing circuit 16 are connected. The internal bus 15a is connected with an image synthesis section 18.

The MPEG decoder 15 is a circuit that decompresses, i.e., decodes, the content data that has been compressed by MPEG, i.e., coded into MPEG2 bit stream or others, to recover the original data. The MPEG2 stream stored in the hard disk drive 24 or others is input to the MPEG decoder 15 via the IDE interface 21 and the internal bus 15a for decoding therein, and the result is then input to the OSD processing circuit 16.

The OSD processing circuit 16 is a circuit that executes a process of synthesizing an OSD image with an input image if required. The OSD image includes a user interface image such as menu screen. The video data provided by the OSD processing circuit 16 is output to the outside from the video output terminal Tv.

The MPEG decoder 15 performs separation of audio data at the time of decoding, and the resulting audio data is output to the outside from the audio output terminal Ta.

The image synthesis section 18 is a circuit that can be incorporated as a video processing IC (Integrated Circuit) or others together with the OSD processing circuit 16, and takes charge of image synthesis of high-frame-rate video generation, which will be described later. The image synthesis section 18 can be implemented by a control program to be run by the CPU 23 or a DSP (Digital Signal Processor) that is not shown.

Between the MPEG decoder 15 and the HDMI terminal Th, an HDMI transmission circuit (HDMI Transmitter) 17 is connected. The MPEG decoder 15 can send out a digital baseband signal including video and audio to the HDMI transmission circuit 17.

The HDMI transmission circuit 17 is a circuit for converting the digital baseband signal into a signal in conformity with the HDMI standards, and for electrically amplifying the conversion result for output from the HDMI terminal Th. The HDMI terminal Th is connected with any other devices, and in the recording and reproduction device 1, the content data stored in the hard disk drive 24, for example, can be copied or moved to the other devices via the IDE interface 21, the internal bus 15a, the MPEG decoder 15, the HDMI transmission circuit 17, and the HDMI terminal Th.

The recording and reproduction device 1 is equipped with a remote controller 2 as an accessory. The CPU bus 15b is connected with a remote-control light reception section 28.

The video output terminal Tv and the audio output terminal Ta of the recording and reproduction device 1 is connected with a display monitor device (not shown, or a television receiver) over a cable. Alternatively, the HDMI terminal Th may be connected with a display monitor device as another device over a cable.

A user issues a command of recording or reproduction through the remote controller 2 or an operation section (not shown) provided to the body of the recording and reproduction device while looking at the menu screen displayed on a display monitor screen provided to the OSD processing circuit 16. A signal, i.e., infrared signal, from the remote controller 2 is received by the remote-control light reception section 28. The signal is then decoded by the CPU 23, thereby defining the control type and the control amount.

The recording and reproduction device 1 of FIG. 2 is equipped with a circuit for receiving digital television broadcasting. To be specific, the recording and reproduction device 1 is connected with a digital reception processing circuit 11d including a digital tuner between an input terminal of the digital reception antenna 10B and the internal bus 15a.

The digital reception processing circuit 11d receives digital broadcast waves of terrestrial broadcasting or satellite broadcasting, and performs frequency conversion, tuning, noise elimination, amplification, and demodulation. With digital broadcasting service, the digital reception processing circuit 11d generates a data string, i.e., digital bit string, called TS (Transport Stream). The digital reception processing circuit 11d also includes a circuit such as descrambler being in charge of decryption, and a demultiplexer being in charge of packet separation.

The descrambler is a processing section in charge of decryption, and the signal after decryption is input to the demultiplexer.

The demultiplexer is a processing section that performs separation of audio data and video data, and with digital broadcasting service, for example, such separation is performed through filtering of TS packets. When program list data, i.e., broadcast EPG information, is attached, the demultiplexer also performs separation of program list data.

After separation as such, similarly to analog broadcasting service, the resulting audio data and video data (and program data) are provided to the hard disk drive 24 for storage therein. When the program list data is attached, a process of enabling display by OSD can be executed.

Described next is the relationship between FIG. 2 and the invention.

In the embodiment of the invention, the recording and reproduction device is provided with a recording and reproduction control section and a higher-quality data acquisition control section.

The recording and reproduction control section serves to record video data of program contents coming from the broadcast station 32 (FIG. 1) for real-time reproduction. To be specific, the CPU 23 controlling the recording and real-time reproduction, and reception therebefore and the portion of a program related to such control correspond to an embodiment of the recording and reproduction control section. The hardware to be controlled by the CPU 23 as such includes the digital reception processing circuit 11d, the internal bus 15a, the IDE interface 21, and the hard disk drive 24. When used are the control memory 27 storing therein a program, and the content memory 26 for processing of recording and real-time reproduction, the hardware related thereto includes the content memory 26 and the CPU 15b.

Note here that the real-time reproduction does not mean complete matching between recording and reproduction in terms of time, but means reproduction at the same time as program reception and recording in a period when a user feels it almost the same timing as the program reception and recording thereafter.

The higher-quality data acquisition control section performs control for execution of a process, e.g., inquiry and downloading, related to acquisition of higher-quality version of video data. The higher-quality version of video data is of the program contents of video data being recorded when recording is started but has a higher quality. The quality herein includes resolution, frame rate, color reproducibility, and any combination thereof. To be specific, the CPU 23 taking in charge of such control for acquisition of the higher-quality version of video data and the portion of a program related to the control correspond to an embodiment of the higher-quality data acquisition control section. The hardware to be controlled by the CPU 23 at this time includes the Ethernet interface 22, the IDE interface 21, and the hard disk drive 24. When used are the control memory 27 storing therein a program, and the content memory 26 for a process related to acquisition of the higher-quality version of video data, the hardware related thereto includes the content memory 26 and the CPU 15b.

Described now is the operation.

Figure 3:
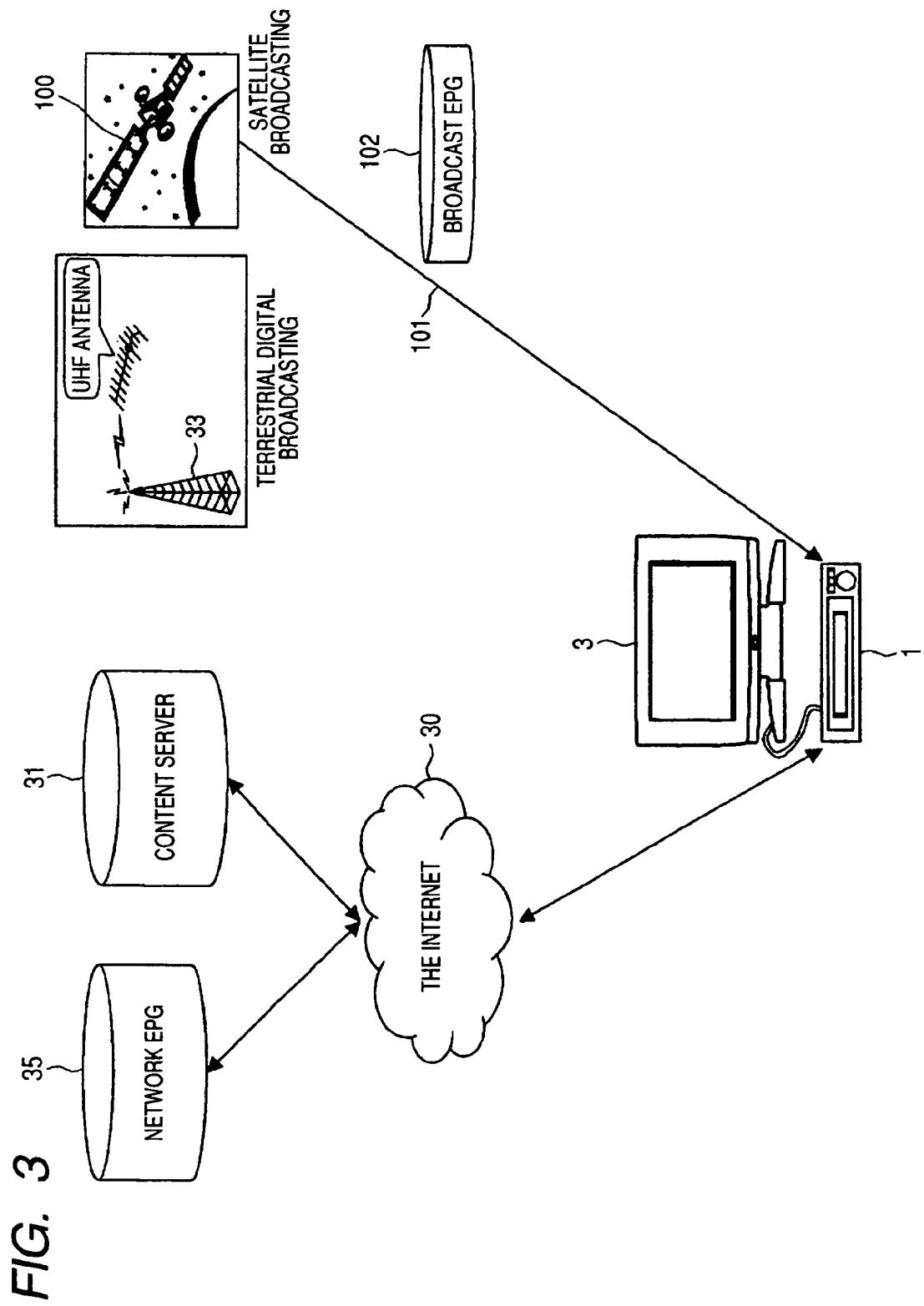
FIG. 3 is a diagram for illustrating an exemplary use at the time of broadcast reception and a network search in the first embodiment.
Figure 4:
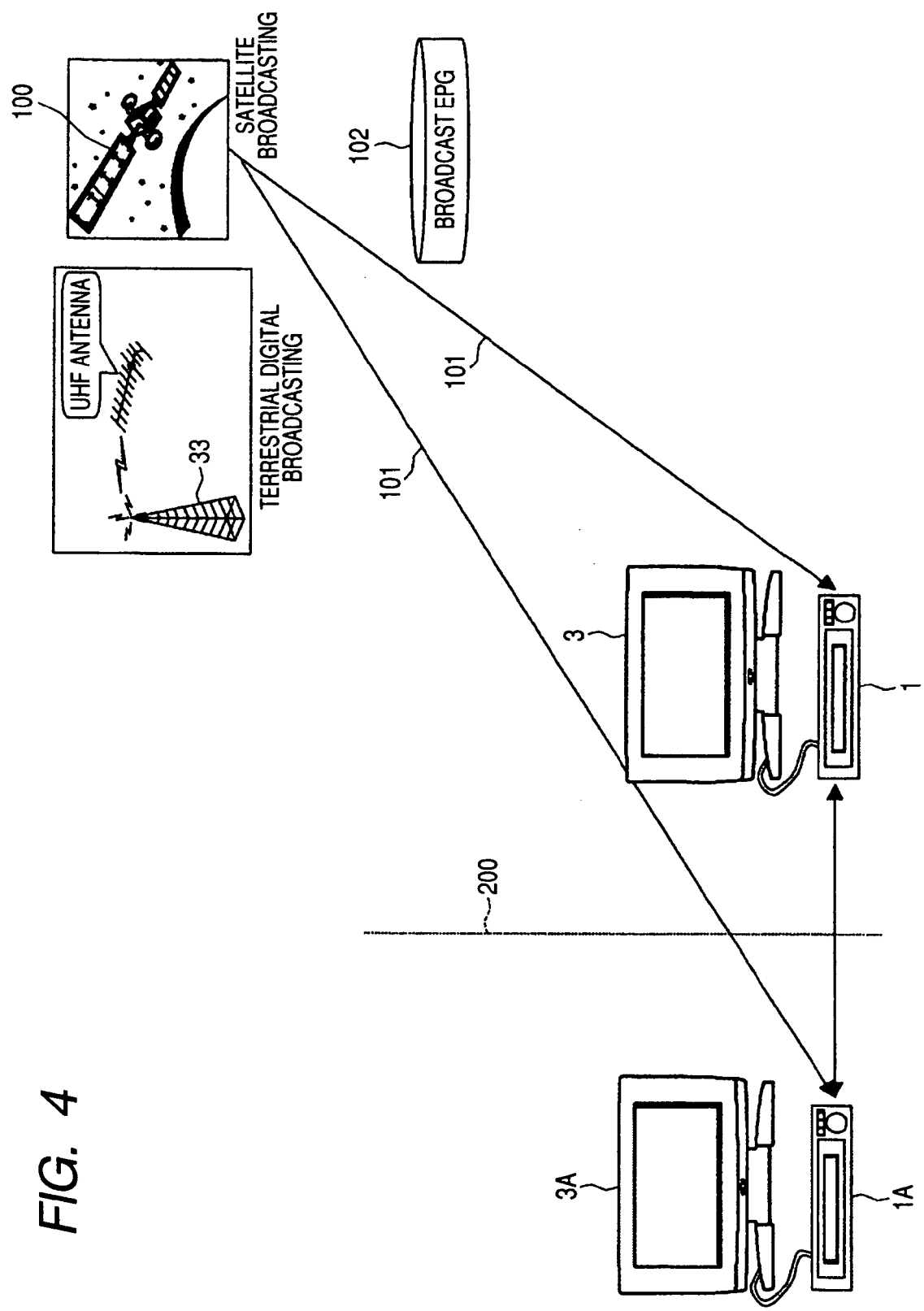
FIG. 4 is a diagram for illustrating an exemplary use at the time of broadcast reception and a local network search in the first embodiment.

FIGS. 3 and 4 each show an example of use state for description of operation.

As shown in FIG. 3, the recording and reproduction device 1 connected with the display monitor device 3 receives satellite digital broadcasting, and radio waves 101 coming from a satellite 100 are attached with broadcast EPG information 102. The network (the Internet in this example) 30 is connected with a server 35 of the network EPG separately from the content server 31.

The recording device 1A connected, over a cable, to the recording and reproduction device 1 of FIG. 4 is already carrying therein video data of a program same as that of content data provided by the satellite 100. In FIG. 4, a reference numeral 200 denotes a house wall, and the recording and reproduction device 1 and the recording device 1A are disposed in each different room separated by the wall 200.

Figure 5:
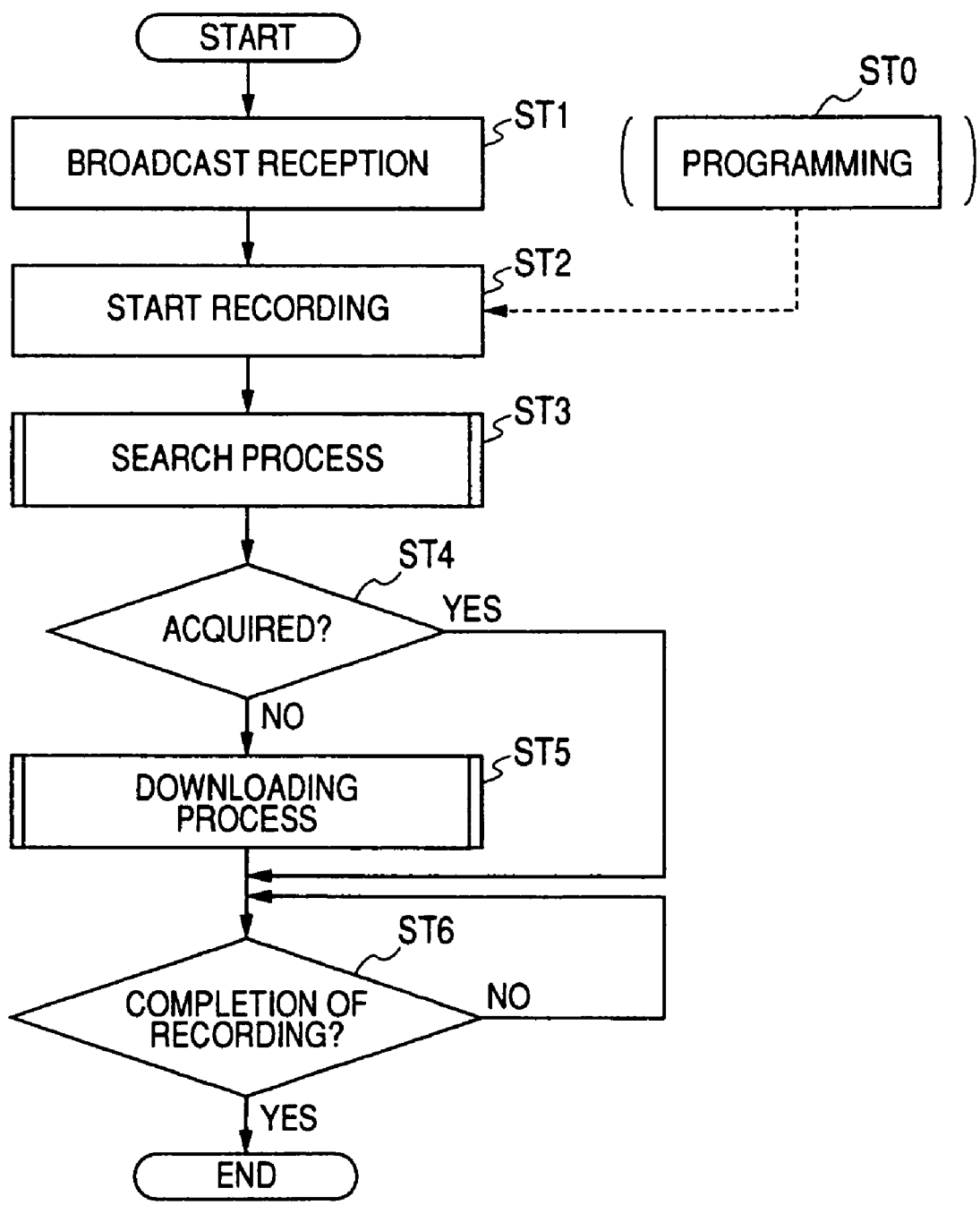
FIG. 5 is a flowchart showing the flow of an entire procedure in the first and second embodiments.

FIG. 5 shows the flow of the entire procedure.

A user makes programming to record a program using the remote controller 2 or others of FIG. 2 before the procedure starts (step ST0).

When the broadcast time comes for the programmed program, the recording and reproduction device 1 becomes ready for reception by a timer function of the CPU 23 of FIG. 2, and broadcast reception is started (step ST1).

The digital reception processing circuit 11d of FIG. 2 performs various operations, i.e., frequency conversion, tuning, noise elimination, amplification, demodulation, decryption, and separation of video signal, audio signal, and program list data. The CPU 23 then starts recording of content data of the program programmed through reference to the program list data (step ST2).

Real-time reproduction is possible at the same time of program recording. When the user asks for real-time reproduction, the recorded portion of program may be reproduced immediately or reproduction, i.e., monitor display, is performed by buffering before recording.

In this embodiment, when recording is started for a program that is available for real-time reproduction, i.e., the start functions as a trigger, first of all, the search process in step ST3 of FIG. 5 can be started. In another embodiment, steps ST3 and ST4 may be skipped, and when recording of a program is started, the procedure may responsively go to the downloading process in step ST5. Described now is a case with the search process.

Figure 6:
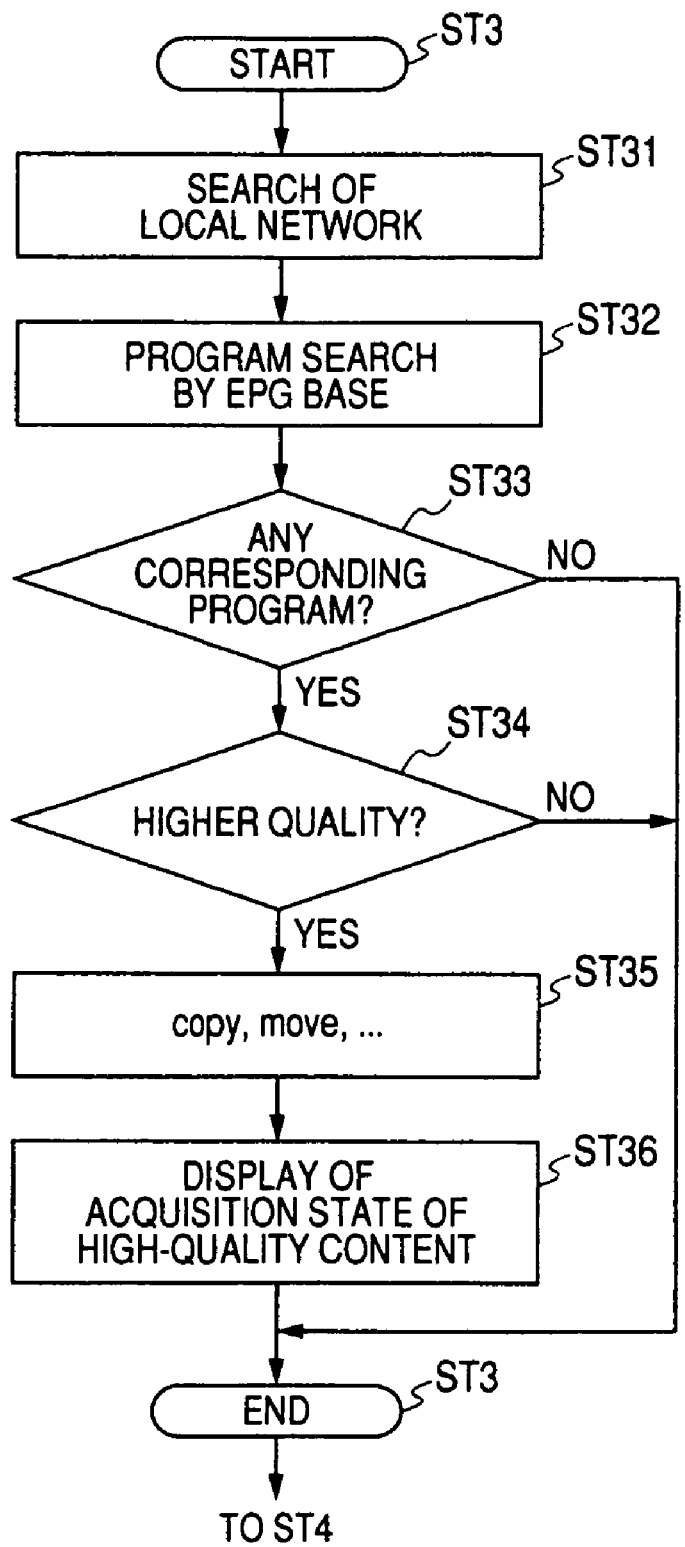
FIG. 6 is a detailed flowchart of a search process (ST3) of FIG. 5.

FIG. 6 shows the detailed flowchart of the search process (step ST3).

In step ST31, a search is made to see what devices are connected in the local network. Thereafter, in step ST32, another search is made in the found device for video data of a program same as that currently being recorded. This search is made through reference to the broadcast EPG information 102 of FIG. 4, i.e., the program list data separated and extracted in step ST1.

Assuming that a program recorded in a specific device, i.e., the recording device 1A of FIG. 1 in this example, is the same as the program currently being recorded. If this is the case, the determination in the next step ST33 is "Yes", and the procedure flow goes to step ST34. On the other hand, when no program is found after searches of every device, the determination in step ST33 is "No", and the search process in step ST3 is thus ended.

In step ST34, a determination is made whether the video data already recorded in the recording device 1A is higher in quality than the video data being recorded, i.e., whether the video data already recorded satisfies at least any one of higher resolution, higher frame rate, and higher color reproducibility.

For such determination making, for example, a component descriptor is referred to. This component descriptor is of SI (Specific Information) information found in TS (Transport Stream) of MPEG2 standards of digital broadcasting service, describing which video data is belonging to which program.

The component descriptor is defined as shown in FIG. 7 in ARIB STD-B10, for example.

The component descriptor of FIG. 7 includes component details, component type, and specific description.

The component details are stream contents, and is 4-bit information indicating the stream type, i.e., type of data such as video, audio, text, and others (hexadecimal notation in FIG. 7).

The component type is 8-bit information indicating the component type for every video, audio, and data (high-order hexadecimal notation—low-order hexadecimal notation in FIG. 7). When the components vary in type, as shown in examples of video in the column of "description" of FIG. 7, other details also vary, i.e., vertical resolution (horizontal resolution), difference between interleave (i) and progressive (p), aspect ratio, and with or without of pan vector. Herein, the "pan vector" denotes pan scanning, and means that an image with the aspect ratio of 16:9 is trimmed right and left sides to derive the aspect ratio of 4:3.

The CPU 23 makes a comparison with respect to SI information between video data stored in the recording device 1A and video data that is currently recorded by the recording and reproduction device 1 into the hard disk drive 24 serving as a storage section. As a result of such a comparison, when the video data in the recording device 1A is higher in resolution or higher in image quality with a higher frame rate compared with the video data received by the recording and reproduction device 1, the determination in step ST34 of FIG. 6 becomes "Yes". When the video data is not high in image quality, the search process in step ST3 is ended.

In the next step ST35, the specific process is to be executed based on the search result.

When copying is possible, through control by the CPU 23, the copy data of high-image-quality video in the recording device 1A is acquired into the recording and reproduction device 1 from a video input path not shown in FIG. 2. The data is then written to an area available in the hard disk drive 24 via the internal bus 15a and the IDE interface 21.

When no copying is possible, data moving is performed in a similar manner. If this is the case, the higher-quality version of video data is deleted in the recording device 1A.

When no such data moving is also possible, a process, i.e., notification process, is executed to add, to a recording list, a mark indicating that there are higher-quality contents in the local network for the program that is currently recorded so that the user is notified of the existence of higher-quality contents.

Next, in step ST36, display of availability state of high-quality contents is made as shown in FIG. 8, for example.

FIG. 8 shows an exemplary recording list screen to be displayed on the screen of a monitor device when a user selects the recording list on the menu screen.

In FIG. 8, assuming that the program displayed at the 6th position is the real-time-reproducible program through recording. In this example, the mode display of the program list is changed from the currently-broadcasting-possible HD mode to "HFR" indicating a high frame rate. This indicates that the high-frame-rate version of video data is being stored in the recording and reproduction device 1 through acquisition, i.e., copying or moving. When the data is of high resolution, e.g., when video data of 2k4k standards is acquired (by copying or moving), the display of this portion may be "2k4k". With the extended range color space standards of "xvYCC", the display is also "xvYCC". Note that, when any higher-quality version of video data is found on the local network but not yet acquired, the position may be indicated by pop-up display, for example.

After step ST36 of FIG. 6 is completed as such, the search process in step ST3 is ended, and the procedure goes to step ST4 of FIG. 5.

Step ST4 is the process of determining whether or not to skip the downloading process in the next step ST5. When the result of step ST3 tells about the state of data acquisition, the procedure can skip step ST5.

That is, when the higher-quality version of video data is already acquired (by copying or moving), the downloading process is skipped, and the procedure is completed after checking the completion of recording in step ST6. When no data is acquired, the downloading process in the next step is executed.

Figure 9:
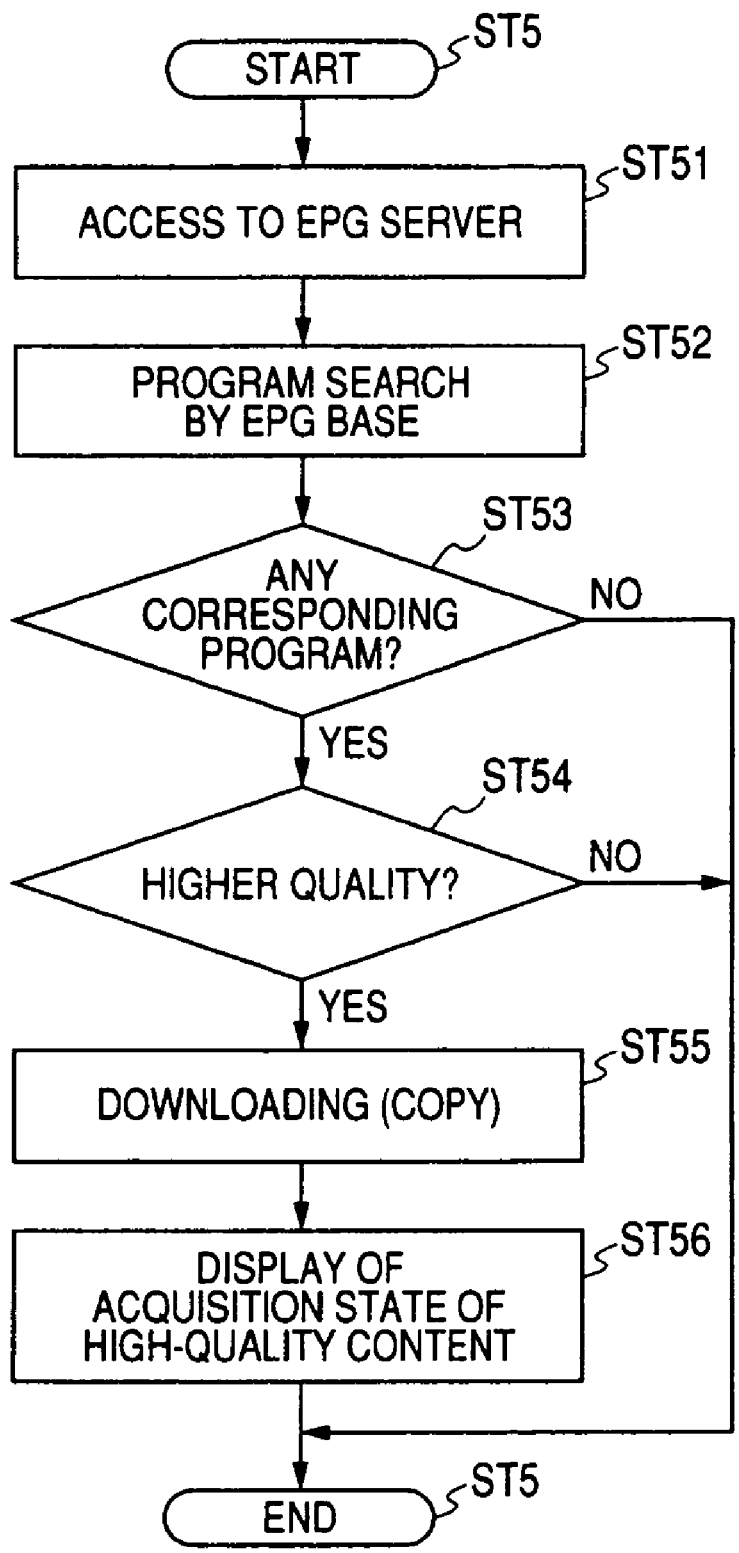
FIG. 9 is a detailed flowchart of a downloading process (ST5) of FIG. 5.

FIG. 9 is a detailed flowchart of the downloading process (step ST5).

In step ST51, an access is made to the content server 31 to check the broadcast waves whether there are any program contents on the Internet same as the program contents being recorded. When the network EPG 35 is found (FIG. 3), and when the acquisition thereof is permitted, the network EPG 35 is accordingly acquired.

Then in step ST52, the CPU 23 in the recording and reproduction device 1 compares meta data (identification data) of the currently-recording program content with information about a component descriptor of the SI information in the acquired network EPG 35, i.e., program search with EPG base. Through such a comparison, a determination is made whether the content server 31 is carrying therein any contents higher in quality (steps ST53 and ST54). The information about the component descriptor of the SI information is basically the same as that of FIG. 7, and the network EPG 35 includes information about a frame rate higher than that of the current broadcasting, and information about a resolution and color reproducibility higher than those of the current broadcasting.

When the determination in step ST53 is "No", i.e., when there is no program content, or when the determination in step ST54 is "No", i.e., when there is such program contents but the quality thereof is not higher than that of the video data of the currently-recording program contents, i.e., unless it satisfies at least any one of higher resolution, higher frame rate, and higher color reproducibility, the process in step ST5 is ended.

When the network carries thereon the contents of the same program, and when the contents are high in quality, in the next step ST55, the higher-quality version of video data is downloaded from the content server 31 (a kind of copy operation on the network).

At this time, because the recorded data being on the air is through with real-time reproduction, the download data forwarded to the hard disk drive 24 via the components of FIG. 2 may be overwritten over the recorded data of lower quality of the same program. The components of FIG. 2 include the network terminal Tn, the Ethernet interface 22, the internal bus 15*a*, and the IDE interface 21. Alternatively, the downloading data may be stored in another hard disk area, and thereafter, the previous low-quality recorded data may be deleted. Note here that when a user has selected "no deletion" during the initial setting or others, the low-quality recorded data is not deleted by overwriting or deletion.

Then in step ST56, the state of acquisition of the high-quality contents is displayed in a similar manner to that of FIG. 8, for example. At this time, if some type of distinction, e.g., color, is made for the manner of acquisition, i.e., downloaded or acquired from the local network, the user finds it convenient.

After step ST56, the downloading process in step ST5 is completed, and the process procedure goes to step ST6 of FIG. 5.

Because downloading takes time, there may be a case that the recording started in step ST2 is completed but not yet downloaded. To be ready for such a case, in step ST6, it is checked whether either broadcasting recording of program contents or recording of the program contents by downloading is correctly completed. When it is determined that the recording is correctly completed, the procedure is ended.

Lastly, exemplified is a preferable case for downloading of data of a high frame rate and the processing thereafter.

The video data with a high resolution is replaced with any previous video data lower in resolution. However, the video data with a high resolution is acquired only by downloading of data complementing the previous low-frame-rate video data. That is, when the low frame rate is 60 fps (frames per second), and when the high frame rate is 240 fps, the remaining video data of 180 fps, which is different from the video data of 60 fps, is acquired, and between the frames of the 60-fps-video-data, the acquired video data is inserted with a ratio of 3 frames to 4 frames. This is the image synthesis processing, and thus the image synthesis section 18 of FIG. 2 takes charge of this processing under the control of the CPU 23. At this time, the video data of low frame rate and the video data after downloading are temporarily stored in the content memory 26, and the data may be synthesized together on the memory.

The generation of a high frame rate through image processing as such is considered preferable in terms of reduction of the amount of downloading data.

Note here that the content server 31 is required to be ready for a service providing video data of such a difference, and is also required to select, for sending out, any video data of frame rates, i.e., the current frame rate and any desired high frame rate. The content server 31 is storing high-frame-rate video data, and extracts only any needed frame from the video data for transmission. Alternatively, the content server 31 may be provided with a server specifically provided for the differential frame data, and from the server, the video data may be sent out.

Note that, with the extended range color space standards such as "xvYCC", similarly to the high-resolution data, the process of replacing every video data related to the program is executed (or process of storing every data to another area).

In the above description, the search process (step ST3) of FIG. 5 may be skipped. That is, irrespective of whether the local network in a house or office carries thereon any higher-quality version of video data of any specific program, an initial setting can be made to acquire the higher-quality version of video data through a downloading process.

In the above description, the timing for the recording system to search any high-quality contents is described as basically being after the broadcasting recording is started. This is surely not restrictive, and when the highest image quality is requested no matter how long it will take, there may be an option of setting at the time of programming to acquire any contents over the network through downloading. If this is the case, the recording and reproduction device 1 may have a function of real-time reproduction but the function may not be used. However, there is a possibility that once-made programming is cancelled, as described above, broadcast recording of program contents may be started just in case, and the starting of recording may be preferably used as a trigger to start the downloading process.

Moreover, instead of acquiring the entire program through downloading, the meta information such as highlighted scene is used as a basis to send out any contents partially high in quality, and at the time of reproduction, the high-quality contents may be selected depending on the scene.

Second Embodiment

Figure 10:
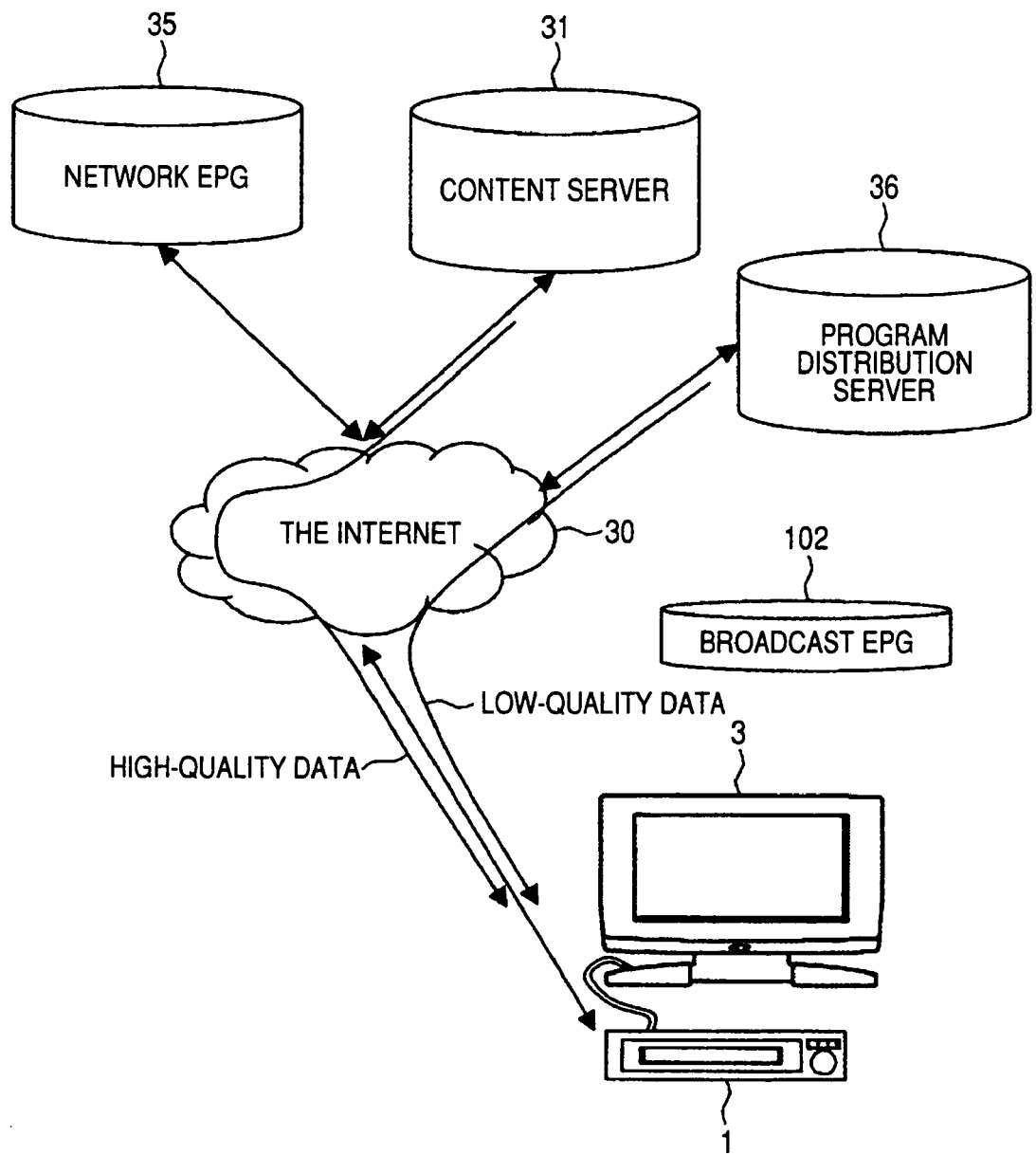
FIG. 10 is a diagram showing an exemplary use when broadcast reception and a network search are made over the same network in the second embodiment.

FIG. 10 is a diagram showing the outline of a system of a second embodiment.

In this embodiment, data of program contents coming from the broadcast station (FIG. 1), i.e., low-quality version of data, is forwarded to the recording and reproduction device 1 via a program distribution server 36 connected to the Internet 30. This low-quality version of data is program content data small in data amount, which can be reproduced in real time by the throughput of the recording and reproduction device 1. When the broadcast EPG information 102 of this low-quality version of data is attached to the data and then distributed, the network EPG 35 or the broadcast EPG information 102 from the program distribution server 36 is stored, and the broadcast EPG information 102 may be acquired in response to a request coming from the recording and reproduction device 1.

In this embodiment, the recording and reproduction device 1 records the program data received by radio waves in the first embodiment into the hard disk drive 24 or others being an internal storage section so that the real-time reproduction is enabled. The broadcast reception over the network is taken place by the CPU 23 controlling the components of FIG. 2, i.e., the network terminal Tn, the Ethernet interface 22, the internal bus 15*a*, the IDE interface 21, and the hard disk drive 24.

Similarly to the first embodiment, at the same time when recording of the low-quality version of data is started, the process for acquiring the higher-quality version of data over the Internet 30 is performed with respect to the content server 31. Acquisition of SI information of the higher-quality version of data is performed similarly to the first embodiment, and when acquisition of the higher-quality version of data is possible, the process is executed to acquire the higher-quality version of data for storage into another area in the storage section, or to rewrite the low-quality version of data through overwriting. Alternatively, with a high frame rate, similarly to the first embodiment, data of a difference is only acquired, and higher-quality version of data may be generated in the storage section through a synthesis process.

Note here that the search process is performed to determine whether or not to acquire the higher-quality version of data over the network based on the search result, and this is similar to the first embodiment. In this second embodiment, the device may be of the configuration similar to that of FIG. 2 capable of acquiring program contents by radio waves or others. Alternatively, the configuration of this embodiment is not necessarily provided with such components as the analog reception antenna 10A, the digital reception antenna 10B, the analog tuner 11a, the digital reception processing circuit 11d, and others.

The procedure of FIGS. 5 to 9 is applied also to this embodiment. Note here that the broadcast reception in step ST1 of FIG. 5 is reception over the network, e.g., the Internet 30, in this embodiment.

The first and second embodiments described above lead to the following advantages and effects.

For recording of video data by broadcasting and real-time reproduction thereof, a user can acquire video data of higher quality in background. Accordingly, when the user selects a list of the same program on the menu screen, and when he or she reproduces the program, the reproduction can be of higher quality, i.e., with higher resolution, higher frame rate, or higher color reproducibility. As such, the resulting program distribution system and recording and reproduction device can allow a user to view real-time program in which the data is of lower quality, and can perform acquisition of higher-quality version of data for storage use without bothering the user.

To be specific, for a program in which viewing in real time is important such as a soccer game, a user tends to enjoy the live broadcasting in real time, and if he or she wants to take time to view the program in time shifting, the video of the program to be reproduced is of higher quality. As such, the user has advantages of viewing the program in real time and collecting the high-quality video easily.

When the user selects to delete any previous low-quality version of data until the higher-quality version of data is reproduced, there is no more disadvantage that the area of a recording medium, i.e., hard disk in this example, is wastefully occupied by any same program.

In the first and second embodiments, before any higher-quality version of data is downloaded, a search is made whether there is any higher-quality version of data for any same program in the local network for the recording and reproduction device, e.g., in the device directly connected to the house-use LAN or the recording and reproduction device. When there is such data, no downloading is performed, thereby favorably reducing any needless downloading. This is with a consideration that a plurality of users each acquire their desiring video data from the local network, and that he or she may not remember such acquisition even if a user has already acquired specific data. This enables to implement a much user-friendly system and device.

A determination about the sameness about programs, and about the quality level of the data can be automatically performed through reference to the EPG information or the SI information or others attached to the digital broadcasting.

With a high frame rate, downloading only frame data of a difference without wasting video data of previous lower frame rate prevents congestion of the Internet, and also prevents any needless expenditure if downloading is billed.

Especially when program distribution is made over the network as in the second embodiment, when no real-time reproduction is available due to restrictions over the communications network speed, for example, video data of higher quality can be downloaded by VOD or others in background for storage in the storage section for later reproduction. This is performed separately from acquisition of low-quality version of video data available for real-time reproduction. If this is the case, when a user is under a contract of performing VOD automatically, he or she has no need to go through the procedure required therefor, and this is thus considered preferable.

It should be understood by those skilled in the art that various modifications, combinations, sub-combinations and alterations may occur depending on design requirements and other factors insofar as they are within the scope of the appended claims or the equivalents thereof.

What is claimed is:

1. A program distribution system, comprising:
   a broadcast station;
   a recording and reproduction device that is capable of recording and reproducing data of program contents coming from the broadcast station by cable or by radio; and
   a content server that is capable of distributing, over a network, the data of the program contents to the recording and reproduction device through connection thereto over the network,
   the recording and reproduction device including:
      a storage section that stores therein the data of the program contents,
      a recording and reproduction control section that can record, into the storage section, video data of the program contents provided from the broadcast station, and can reproduce the video data in real time,
      a display section that can display a recording list that includes a listing associated with the program contents,
      a higher-quality data acquisition control section that makes an inquiry to the content server, over the network after recording with real-time-reproduction is started as a result of control by the recording and reproduction control section and without requiring any specific user operation, about a possibility of acquisition of a higher quality version of data of the program contents than the data recorded by acquiring an electronic program guide (EPG) and comparing meta data of the data recorded with that contained in the EPG, and in response to an inquiry result being positive, acquires the higher-quality version of the data from the content server over the network whereby the display section provides notification, in association with the listing associated with the program contents, that the higher quality version of data of the program contents has been detected, and
      a search control section that searches directly or over a local network, without requiring any specific user operation when recording with real-time-reproduction is started, (i) whether another recording device is connected thereto by cable or by radio, and (ii) in response to the another recording device being detected, whether a higher quality version of the video data than the data recorded with real-time-reproduction is already recorded therein,
   wherein in response to the higher-quality version of the video data being detected as a result of the search made by the search control section, the detected higher-quality version of the video data is copied or moved from the another recording device to the recording and reproduction device, or a result of the search is informed thereto, and in response to the higher-quality version of the video data not being detected, the higher-quality data acquisition control section makes the inquiry to the content server.

2. The program distribution system according to claim 1, wherein the higher-quality version of the data is any one of video data with a resolution higher compared with video data of the program contents provided by the broadcast station, video data with a frame rate higher compared therewith, and video data of extended range color space standards with color reproducibility higher compared therewith.

3. The program distribution system according to claim 2, wherein when the higher-quality version of the data is the video data with the higher resolution or the video data of the extended range color space standards, the higher-quality data acquisition control section controls the storage section to store therein the higher-resolution video data or the video data of the extended range color space standards as a replacement of the video data of the program contents being in storage.

4. The program distribution system according to claim 2, further comprising:
an image synthesis section that can perform frame rate conversion through image synthesis, wherein
when the higher-quality version of the data is the video data with the higher frame rate, the higher-quality data acquisition control section performs control of synthesizing, by the image synthesis section, through control over the image synthesis section and the storage section, the video data stored in the storage section with the high-frame-rate video data of the program contents provided by the content server, and generating a high-frame-rate image on the storage section.

5. The program distribution system according to claim 1, wherein the higher-quality data acquisition section identifies a resolution, a frame rate, or standards of a color space by referring to service information attached to the video data provided by the broadcast station, and uses an identification result for the inquiry together with program identification information in an electronic program guide (EPG).

6. A recording and reproduction device capable of recording and reproducing data of program contents coming from a broadcast station by cable or by radio, the device comprising:

a storage section that stores therein the data of the program contents;
a recording and reproduction control section that can record, into the storage section, video data of the program contents provided from the broadcast station, and can reproduce the video data in real time;
a display section that can display a recording list that includes a listing associated with the program contents;
a higher-quality data acquisition control section that makes an inquiry to a content server, over the network after recording with real-time-reproduction is started as a result of control by the recording and reproduction control section and without requiring any specific user operation, about a possibility of acquisition of higher quality version of data of the program contents than the data recorded by acquiring an electronic program guide (EPG) and comparing meta data of the data recorded with that contained in the EPG, and in response to an inquiry result being positive, acquires the higher-quality version of the data from the content server over the network whereby the display section provides notification, in association with the listing associated with the program contents, that the higher quality version of data of the program contents has been detected; and
a search control section that searches directly or over a local network, without requiring any specific user operation when recording with real-time-reproduction is started, (i) whether another recording device is connected thereto by cable or by radio, and (ii) in response to the another recording device being detected, whether a higher quality version of the video data than the data recorded with real-time-reproduction is already recorded therein,
wherein in response to the higher-quality version of the video data being detected as a result of the search made by the search control section, the detected higher-quality version of the video data is copied or moved from the another recording device to the recording and reproduction device, or a result of the search is informed thereto, and in response to the higher-quality version of the video data not being detected, the higher-quality data acquisition control section makes the inquiry to the content server.

* * * * *